United States Patent
Choi et al.

(10) Patent No.: US 11,128,927 B2
(45) Date of Patent: Sep. 21, 2021

(54) CONTENT PROVIDING SERVER, CONTENT PROVIDING TERMINAL, AND CONTENT PROVIDING METHOD

(71) Applicant: NAVER Corporation, Seongnam-si (KR)

(72) Inventors: Byung Gyou Choi, Seongnam-si (KR); Chan Su Suh, Seongnam-si (KR); Song Hyun Park, Seongnam-si (KR); Sung Hyun Lee, Seongnam-si (KR)

(73) Assignee: NAVER CORPORATION, Seongnam-si (KR)

(*) Notice: Subject to any disclaimer, the term of this patent is extended or adjusted under 35 U.S.C. 154(b) by 0 days.

(21) Appl. No.: 16/002,856

(22) Filed: Jun. 7, 2018

(65) Prior Publication Data
US 2018/0359537 A1    Dec. 13, 2018

(30) Foreign Application Priority Data
Jun. 7, 2017    (KR) .................. 10-2017-0070883

(51) Int. Cl.
*H04N 21/488*    (2011.01)
*G06K 9/00*    (2006.01)
(Continued)

(52) U.S. Cl.
CPC ....... *H04N 21/4884* (2013.01); *G06F 16/745* (2019.01); *G06K 9/00718* (2013.01);
(Continued)

(58) Field of Classification Search
CPC ............. G06F 16/745; G06K 9/00718; G06K 9/00751; H04N 21/47217; H04N 21/4884; H04N 21/8456
(Continued)

(56) References Cited

U.S. PATENT DOCUMENTS 6,271,892 B1 *   8/2001   Gibbon ............... H04N 19/142
                                                   348/700
6,580,437 B1 *   6/2003   Liou ................... G06F 16/7844
                                                   715/719
(Continued)

FOREIGN PATENT DOCUMENTS

CN    103533256 A    1/2014
CN    103647909 A    3/2014
(Continued)

OTHER PUBLICATIONS

Behzad Shahraray and David C. Gibbon "Automatic generation of pictorial transcripts of video programs", Proc. SPIE 2417, Multimedia Computing and Networking, 1995. (Year: 1995).*
(Continued)

*Primary Examiner* — Thai Q Tran
*Assistant Examiner* — Stephen R Smith
(74) *Attorney, Agent, or Firm* — Greer Burns & Crain Ltd.

(57) ABSTRACT

Provided are a content providing server, a content providing terminal, a content providing method. A search for image content is facilitated through a subtitle page including a unit subtitle separated by a subtitle interval, during which a subtitle is displayed in image content, and a representative image extracted from the subtitle interval in the image content, so that a user views the image content according to the user's level of understanding.

16 Claims, 14 Drawing Sheets

(51) Int. Cl.
*H04N 21/472* (2011.01)
*H04N 21/845* (2011.01)
*G06F 16/74* (2019.01)

(52) U.S. Cl.
CPC ... *H04N 21/47217* (2013.01); *H04N 21/8456* (2013.01); *G06K 9/00751* (2013.01)

(58) Field of Classification Search
USPC ........ 386/239, 241, 290; 348/564, 588, 700; 709/220; 715/719; 704/235
See application file for complete search history.

(56) References Cited

U.S. PATENT DOCUMENTS

| | | | | |
|---|---|---|---|---|
| 6,928,233 | B1* | 8/2005 | Walker | H04N 19/503 |
| | | | | 386/241 |
| 8,671,337 | B2* | 3/2014 | Matthews | H04N 21/4147 |
| | | | | 715/201 |
| 8,848,109 | B2* | 9/2014 | Pornprasitsakul | G11B 27/031 |
| | | | | 348/588 |
| 2001/0003214 | A1* | 6/2001 | Shastri | H04N 7/17318 |
| | | | | 725/109 |
| 2003/0120748 | A1* | 6/2003 | Begeja | H04N 7/17318 |
| | | | | 709/217 |
| 2003/0208626 | A1* | 11/2003 | Gibbon | G06F 16/748 |
| | | | | 709/247 |
| 2005/0028194 | A1* | 2/2005 | Elenbaas | G11B 27/22 |
| | | | | 725/32 |
| 2006/0284981 | A1* | 12/2006 | Erol | G11B 27/034 |
| | | | | 348/207.1 |
| 2008/0046406 | A1* | 2/2008 | Seide | G06F 16/68 |
| 2008/0124055 | A1* | 5/2008 | Shahraray | G06F 16/71 |
| | | | | 386/241 |
| 2009/0310021 | A1* | 12/2009 | Kondo | H04N 5/44513 |
| | | | | 348/564 |
| 2010/0158483 | A1* | 6/2010 | Yamada | G11B 27/322 |
| | | | | 386/241 |
| 2011/0013882 | A1* | 1/2011 | Kusunoki | G11B 27/28 |
| | | | | 386/241 |
| 2011/0043652 | A1* | 2/2011 | King | G06F 17/2211 |
| | | | | 348/222.1 |
| 2011/0293250 | A1* | 12/2011 | Deever | G06K 9/00765 |
| | | | | 386/290 |
| 2012/0078626 | A1* | 3/2012 | Tsai | G10L 15/26 |
| | | | | 704/235 |
| 2014/0040222 | A1* | 2/2014 | Schmitz | G06K 9/00973 |
| | | | | 707/705 |
| 2014/0123178 | A1* | 5/2014 | Burkitt | H04N 21/23424 |
| | | | | 725/34 |
| 2014/0164507 | A1* | 6/2014 | Tesch | H04L 51/10 |
| | | | | 709/204 |
| 2015/0003797 | A1* | 1/2015 | Schmidt | G11B 27/031 |
| | | | | 386/201 |
| 2015/0365736 | A1* | 12/2015 | Xiong | H04N 21/8456 |
| | | | | 725/88 |
| 2016/0105708 | A1* | 4/2016 | Packard | H04N 21/25891 |
| | | | | 725/10 |
| 2016/0277779 | A1* | 9/2016 | Zhang | H04N 21/234381 |
| 2016/0295132 | A1* | 10/2016 | Burgess | G11B 27/10 |
| 2018/0189249 | A1* | 7/2018 | Berman | G06F 40/166 |

FOREIGN PATENT DOCUMENTS

| | | |
|---|---|---|
| CN | 105025378 A | 11/2015 |
| CN | 106792145 A | 5/2017 |
| JP | 2008047004 A | 2/2008 |
| JP | 2009171388 A | 7/2009 |
| JP | 2010045486 A | 2/2010 |
| JP | 2012063854 A | 3/2012 |
| JP | 2013020559 A | 1/2013 |
| JP | 2016009262 A | 1/2016 |
| KR | 1019990064823 A | 8/1999 |
| KR | 1020080050657 A | 6/2008 |
| KR | 1020130082936 A | 7/2013 |
| KR | 1020140141408 A | 12/2014 |
| KR | 1020170045920 A | 4/2017 |

OTHER PUBLICATIONS

Korean office action issued in Korean App. No. 10-2017-0070883, dated Apr. 3, 2018.
Office action issued in Taiwanese application No. 107119172, dated Apr. 26, 2019.
Office action issued in Japanese application No. 2018-108345, dated May 28, 2019.
U.S. Appl. No. 16/409,029, filed May 10, 2019.
Chinese Office Action for corresponding Chinese Patent Application No. 201810466879.7 dated Apr. 19, 2021 (14 pages).

* cited by examiner

CONTENT PROVIDING SERVER, CONTENT PROVIDING TERMINAL, AND CONTENT PROVIDING METHOD

CROSS-REFERENCE TO RELATED APPLICATION

This application claims the benefit of Korean Patent Application No. 10-2017-0070883, filed on Jun. 7, 2017 in the Korean Intellectual Property Office, the disclosure of which is incorporated herein in its entirety by reference.

BACKGROUND OF THE INVENTION

1. Field of the Invention

The present invention relates to a content providing server, a content providing terminal, and a content providing method, and more particularly, to a content providing server, a content providing method, and a content providing terminal, which generate and provide a subtitle page corresponding to information extracted from image content.

2. Description of the Related Art

Due to the development of communication technology and culture, a variety of image content is being produced and spreading to all over the world. However, in the case of image content, a viewer cannot control a reproduction progress level of content, as opposed to books. Therefore, the viewer has to view an image, regardless of the viewer's understanding of the content of the reproduced image. Therefore, in order to solve such a problem, various methods for controlling a reproduction time of an image or searching for an image have been proposed.

As a representative method for controlling a reproduction time of an image, there is a control method using a scroll bar. As for the control method using the scroll bar, when a user selects an arbitrary point in a scroll region generated according to a reproduction time of an image, the reproduction time of the image is shifted to the corresponding time.

However, the scroll region has a constant length, regardless of the reproduction time of the image. Thus, when the reproduction time of the image is long, the reproduction time of the image is greatly changed even with a small movement in the scroll region. Consequently, it is difficult to finely control the reproduction time of the image. In particular, when a user views an image in a mobile environment, the size of a display is small and the scroll bar is often controlled with a finger, which makes it difficult to control a reproduction time of an image.

In addition, in the case of the image, subtitles or captions for describing the speeches of characters or the reproduced contents are often provided so as to help the user's understanding. However, when the user uses a scrolling function to find subtitles of specific contents from an image, it is not easy to find subtitles for a desired scene and speech due to the above difficulty.

In addition, when the user wants to grasp contents of an image in an environment in which the communication speed of the user is limited, in a case where the image has high capacity or high definition, the image cannot be smoothly provided from a server to a content providing terminal, which makes it difficult to view all the scenes of the image in real time. In this case, there is a need for a content providing method capable of reducing a data transmission amount of a server by selectively viewing only important scenes of an image.

PATENT LITERATURE

Korean Patent Application Publication No. 10-2008-0050657

BRIEF SUMMARY OF THE INVENTION

One or more embodiments of the present invention are directed to generate a subtitle page through subtitle information and a representative image extracted from image content, and facilitate the search of the image content through a plurality of subtitle pages, thereby enabling a user to view the image content according to the user's level of understanding.

One or more embodiments of the present invention are directed to enable a user to view the image content even in an environment in which a transmission speed required in data communication is limited.

According to one or more embodiments of the present invention, a content providing server includes: a subtitle page generating unit configured to generate a subtitle page including a unit subtitle of a subtitle interval, during which a subtitle is displayed in image content, and a representative image extracted from the image content; and an image information extracting unit configured to extract the representative image corresponding to the subtitle interval in the image content, wherein the subtitle page generating unit generates a plurality of subtitle pages corresponding to a plurality of subtitle intervals dividing the image content, and display the plurality of subtitle pages to a user of a content providing terminal.

According to one or more embodiments of the present invention, a content providing method, which is performed by a content providing server, includes: acquiring a unit subtitle of a subtitle interval, during which a subtitle is displayed in image content; extracting a representative image representing the subtitle interval in the image content; generating a plurality of subtitle pages including the unit subtitle and the representative image according to an order of a plurality of subtitle intervals dividing the image content; and providing the plurality of subtitle pages to a content providing terminal.

According to one or more embodiments of the present invention, a content providing terminal includes: a display; a memory configured to store at least one program; and a processor configured to operate according to the control of the at least one processor, wherein the processor displays, on the display, one of a plurality of subtitle pages corresponding to each subtitle interval, during which a subtitle is displayed in image content, according to a reproduction order of the image content, the plurality of subtitle pages include a first display region for displaying a unit subtitle corresponding to the subtitle interval and a second display region for displaying a representative image corresponding to the subtitle interval, and the representative image is extracted from the subtitle interval of the image content.

According to one or more embodiments of the present invention, a content providing terminal includes: a display; a subtitle page generating unit configured to generate a subtitle page including a unit subtitle of a subtitle interval, during which a subtitle is displayed in image content, and a representative image extracted from the image content; and an image information extracting unit configured to extract the representative image corresponding to the subtitle interval in the image content, wherein the subtitle page generating unit generates a plurality of subtitle pages corresponding to a plurality of subtitle intervals dividing the image content, and display the plurality of subtitle pages to a user through the display.

According to one or more embodiments of the present invention, a content providing method, which is performed by a content providing terminal, includes: acquiring a unit subtitle of a subtitle interval, during which a subtitle is displayed in image content; extracting a representative image representing the subtitle interval in the image content; generating a plurality of subtitle pages including the unit subtitle and the representative image according to an order of a plurality of subtitle intervals dividing the image content; and displaying the plurality of subtitle pages to a user through a display.

According to one or more embodiments of the present invention, a content providing terminal includes: a display; a communication unit connected to a server through Internet; and a subtitle page generating unit configured to generate a subtitle page including a unit subtitle of a subtitle interval, during which a subtitle is displayed in image content, and a representative image extracted from the image content according to the subtitle interval, wherein the unit subtitle and the representative image are source information provided by the server in response to a source information request from the subtitle page generating unit, and the subtitle page generating unit receives the source information through the communication unit, generates a plurality of subtitle pages corresponding to a plurality of subtitle intervals dividing the image content by using the source information, and displays the plurality of subtitle pages to a user through the display.

According to one or more embodiments of the present invention, a content providing method, which is performed by a content providing terminal, includes: requesting source information including a unit subtitle of a subtitle interval, during which a subtitle is displayed in image content, and a representative image extracted from the image content according to the subtitle interval; receiving the source information from a server; and generating a plurality of subtitle pages corresponding to a plurality of subtitle intervals dividing the image content by using the source information and providing the plurality of subtitle pages to a user.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, exemplary embodiments of the present invention will be described in detail with reference to the accompanying drawings.

The following embodiments are provided for helping comprehensive understanding of methods, apparatuses, and/or systems described herein. However, this is merely an example and the present invention is not limited thereto.

Also, while describing the present invention, detailed descriptions about related well-known functions or configurations that may diminish the clarity of the points of the present invention are omitted.

The terms used herein are those general terms currently widely used in the art in consideration of functions in regard to the present invention, but the terms may vary according to the intention of those of ordinary skill in the art, precedents, or new technology in the art. The terms used in the present specification are merely used to describe particular embodiments, and are not intended to limit the present invention. An expression used in the singular encompasses the expression in the plural, unless it has a clearly different meaning in the context. In the present specification, it is to be understood that terms such as "including" or "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

It will be understood that although the terms "first", "second", etc. may be used herein to describe various components, these components should not be limited by these terms. These components are only used to distinguish one component from another.

Hereinafter, a content providing server, a content providing method, and a content providing terminal, according to the present invention, will be described in detail with reference to the accompanying drawings.

Figure 1:
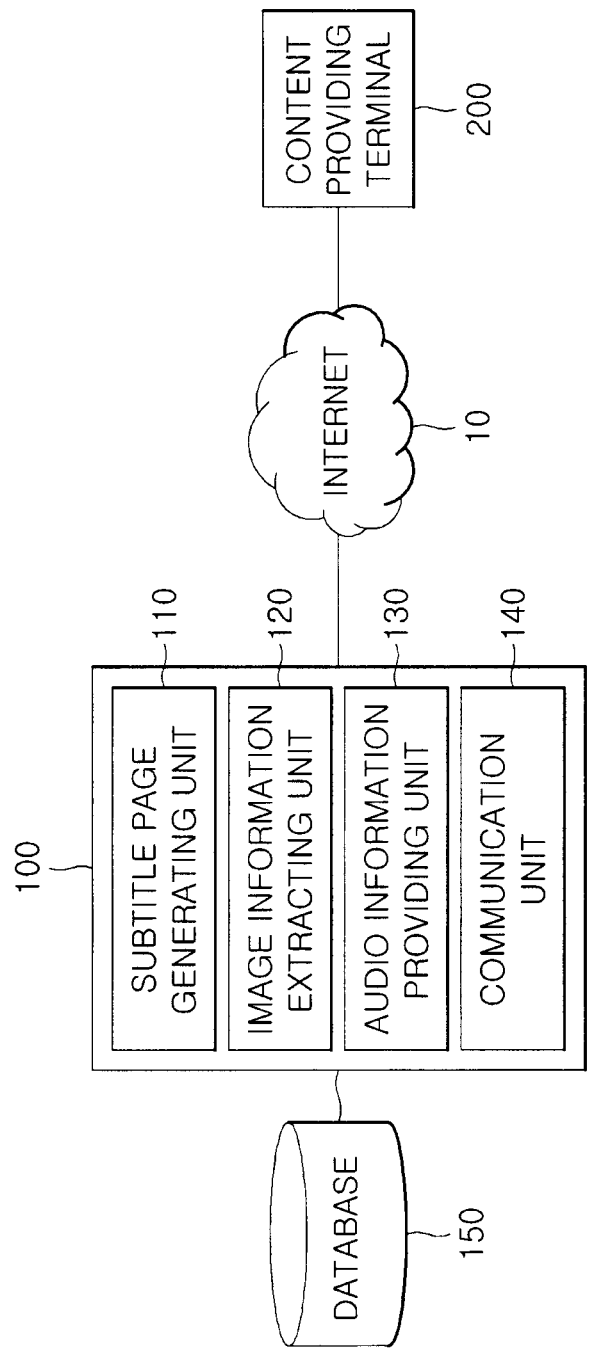
FIG. 1 is a block diagram illustrating a configuration of a content providing server according to an embodiment of the present invention.

FIG. 1 is a block diagram illustrating a configuration of a content providing server according to an embodiment of the present invention.

Referring to FIG. 1, the content providing server 100 may include a subtitle page generating unit 110, an image information extracting unit 120, an audio information providing unit 130, and a communication unit 140.

The content providing server 100 may be a server connected online to a content providing terminal 200 through the Internet 10. The Internet 10 may be an example of various communication methods for connecting the content providing server 100 and the content providing terminal 200 online. The content providing terminal 200 may refer to a terminal device capable of accessing a web/mobile site related to a content providing method or installing and executing a service-dedicated application. Examples of the content providing terminal 200 may include a personal computer, a notebook, a smartphone, a tablet, and a wearable computer. The content providing terminal 200 used herein may refer to a content providing terminal which searches for subtitle pages provided by the content providing server 100.

The content providing terminal 200 is a terminal which reproduces a subtitle page provided by the content providing server 100. The content providing terminal 200 may perform an overall service operation, such as service screen configuration, data input, data transmission and reception, or data storage under the control of the web/mobile site or the dedicated application.

The content providing server 100 may generate a plurality of subtitle pages from the image content stored in a database 150 by using at least one of subtitle information, a representative image, and audio information, and provide the plurality of subtitle pages to the content providing terminal 200 through the communication unit 140.

The content providing server 100 may be a computer system. The content providing server 100 may include a processor. The processor may process a calculation required for extracting other information from the image content information and combining the extracted information. The subtitle page generating unit 110, the image information extracting unit 120, and the audio information providing unit 130 may be part of the processor of the content providing server 100, or may be a module, a function, or a unit performed by the processor.

Image content may be content output from the content providing terminal 200, may refer to a video which is continuously composed of a plurality of frames together with an audio and can be reproduced. The image content may be downloaded in the form of a file by the content providing terminal 200, or may be transmitted in a streaming manner.

In addition, a subtitle page may include information about a page displayed to the user through the content providing terminal 200. The subtitle page may be configured to display only the unit subtitle and the representative image on a display of the content providing terminal 200, or may be configured to output audio information together while displaying the unit subtitle and the representative image. The subtitle page may be generated by the subtitle page generating unit 110.

The subtitle page generating unit 110 may load (or acquire), from subtitle information, a unit subtitle corresponding to at least one subtitle interval existing in the image content. The subtitle information may refer to information about subtitles representing various dialogs output from the image content in the form of a text. The various dialogs may include a narration used for describing the conversation contents of characters or objects appearing in the image content. The subtitle page generating unit 110 may extract information related to the subtitle interval and the unit subtitle from the subtitle information.

The subtitle interval may refer to a time interval in which subtitles are displayed during the reproduction interval of the image content. The subtitle interval may be arbitrarily set by a subtitle producer or editor. The subtitle producer refers to a person who generates the subtitles for image content and uploads the subtitles to match the image content. The subtitle interval is not set to be limited to an interval during which the speech or narration in the image content is output. Therefore, the subtitle producer or editor may set an arbitrary interval of the image content as the subtitle interval. The subtitle composed of at least one word displayed in each subtitle interval may be regarded as the unit subtitle.

The subtitle interval may include a subtitle start time for the reproduction time of the image content at which the display of each unit subtitle is started, a subtitle end time for the reproduction time of the image content at which the display of each unit subtitle is ended, and a subtitle display time for the time at which the display of the unit subtitle is maintained within the subtitle interval. For example, the subtitle of A is displayed from 5:20 to 5:25 in the reproduction interval of the image content, the interval from 5:20 to 5:25 may be set as the subtitle interval, and the unit subtitle of the subtitle interval may be set as A.

The subtitle information is information about the subtitle related to the image content and may be provided while being included in the image content, or may be provided separately from the image content. The subtitle information may be produced by the subtitle producer and stored in the database 150.

The subtitle interval may set the reproduction time of the image content as a reference, and at least one unit subtitle may exist as many as the number of subtitle intervals. The at least one unit subtitle may have an order according to the reproduction order of the subtitle intervals.

The image information extracting unit 120 may extract a representative image from the image content. The representative image may be information extracted from the subtitle interval in the image content.

The representative image may be one of successive frames of the image content reproduced within the subtitle interval. More specifically, the representative image may be a frame that is arbitrarily selected or selected in accordance with a previously set rule (for example, a frame in the first order or a frame in the middle order in the subtitle interval). Each subtitle page corresponding to each subtitle interval may have a representative image representing the subtitle page. In one or more embodiments, one representative image may be extracted, or a plurality of representative images may be extracted.

The subtitle page generating unit 110 may generate the subtitle page by using the unit subtitle and the representative image.

In one or more embodiments, the subtitle page may be generated by including audio information as well as the unit subtitle and the representative image. At this time, audio information used for generating the subtitle page may be provided by the audio information providing unit 130.

The audio information providing unit 130 may provide the audio information corresponding to the subtitle interval of the image content. The audio information may refer to an audio output during each subtitle interval. More specifically, the audio information providing unit 130 may separate an audio corresponding to the subtitle interval among audios output during the entire interval of the image content, and provide the separated audio to the subtitle page generating unit 110 as audio information.

The relationship between the unit subtitle, the image content, and the audio information will be described below. It is assumed that the image content is displayed from 2:30 to 2:45 and from 4:10 to 4:20 with reference to the reproduction time of the image content. The subtitle page generating unit 110 may recognize 2:30 to 1:45 of the image content from the subtitle information as one subtitle interval and generate a subtitle page (first subtitle page) corresponding to the subtitle interval, and may recognize 4:10 to 4:20 of the image content as another subtitle interval and generate a subtitle page (second subtitle page) corresponding to the subtitle interval.

The subtitle page generating unit 110 may recognize subtitles displayed during the subtitle interval of the first subtitle page (interval from 2:30 to 2:45 with reference to the reproduction time of the image content) as one unit subtitle, and the image information extracting unit 120 may extract one of frames reproduced during the subtitle interval as a representative image. In addition, the audio information providing unit 130 may recognize and provide an audio output during the subtitle interval of the first subtitle page as audio information. Then, the subtitle page generating unit 110 may generate the first subtitle page by using the unit subtitle, the representative image, and the audio information.

Then, the subtitle page generating unit 110 may load the unit subtitle corresponding to the subtitle interval of the second subtitle page (interval from 4:10 to 4:20 with reference to the reproduction time of the image content), the image information extracting unit 120 may extract a representative image, and the audio information providing unit 130 may provide audio information, thereby generating the second subtitle page. As described above, the process by which the subtitle page generating unit 110 generates the subtitle page may be performed several times according to the number of subtitle intervals.

The audio information may be extracted from the image content and exist as a separate audio file. In addition, when the content providing terminal 200 reproduces the image content, the audio information may be provided so that only audio is output according to the reproduction time, without displaying the screen of the image content to the user.

The communication unit 140 may transmit at least one of the image content and the subtitle page to the content providing terminal 200.

The database 150 may be information storage hardware, such as hard disk drive (HDD), solid state drive (SSD), random access memory (RAM), and flash memory. The database 150 may be mounted on the content providing server 100 or mounted on a separate device, and may be connected to the content providing server 100 online or offline.

The configuration of the content providing server 100 used in the following drawings will be described by using the configuration and reference signs illustrated in FIG. 1.

Figure 2:
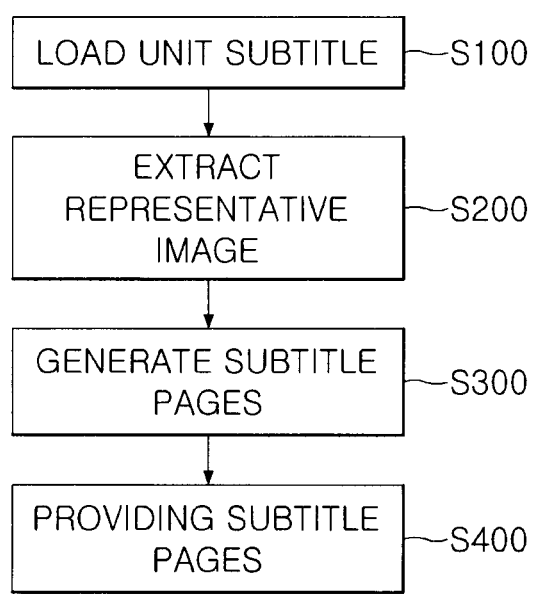
FIG. 2 is a flowchart of a content providing method according to an embodiment of the present invention.

FIG. 2 is a flowchart of a content providing method according to an embodiment of the present invention. Referring to FIG. 2, an image content providing method may include operation S100 of loading a unit subtitle, operation S200 of extracting a representative image, operation S300 of generating a plurality of subtitle pages, and operation S400 of providing a plurality of subtitle pages.

In operation S100 of loading the unit subtitle, the subtitle page generating unit 110 may load the unit subtitle. More specifically, when the subtitle page generating unit 110 receives a request for providing at least one of image content and a subtitle page from the content providing terminal 200, the subtitle page generating unit 110 may load subtitle information corresponding to the image content from the database 150. In one embodiment, the subtitle information may include a known subtitle file having an extension such as .smi. Information about the subtitle interval and unit subtitles corresponding to each subtitle interval may be included in the subtitle information loaded by the subtitle page generating unit 110.

In operation S200 of extracting the representative image, the image information extracting unit 120 may extract a representative image corresponding to the subtitle interval from the image content.

In operation S300 of generating the plurality of subtitle pages, the unit subtitle and the representative image may be inserted into each subtitle page according to the order of the plurality of subtitle intervals including the image content.

The respective subtitle pages constituting the plurality of subtitle pages may be mutually connected by links, so as to enable the movement between the subtitle pages of the adjacent order. Therefore, when the user views an arbitrary subtitle page and then requests a page movement request to the content providing terminal 200, it is possible to move to a subtitle page in a previous order or a subsequent order. The user can view the image content in page units just like books by searching for the subtitle pages arranged in the order of the subtitle intervals back and forth. Therefore, the user can view the contents of the image content according to the user's understanding level and can view only the subtitle interval in the contents of the image content, so that the user can understand the contents of the image content at a high speed.

Operation S400 of providing the plurality of subtitle pages may be operation of providing the plurality of subtitle pages generated by the subtitle page generating unit 110 to the content providing terminal 200 through the communication unit 140.

The plurality of subtitle pages provided to the content providing terminal 200 may perform various functions according to the processing of the content providing terminal 200, which will be described below.

Figure 3:
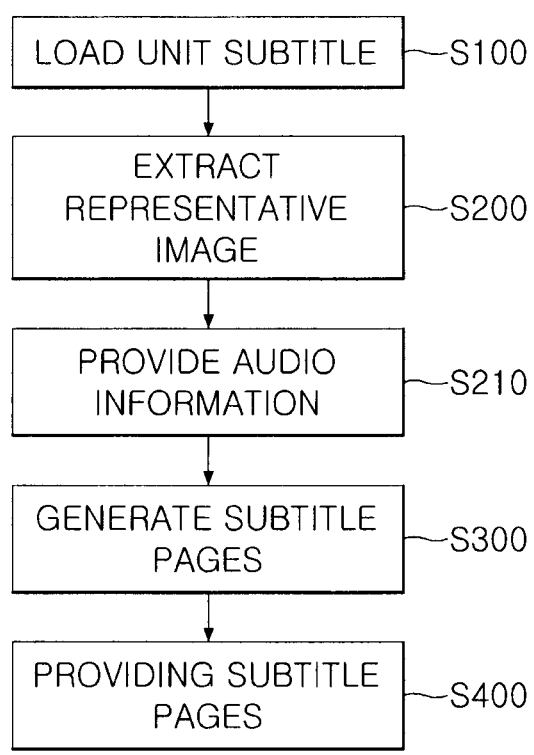
FIG. 3 is a flowchart of a content providing method according to an embodiment of the present invention.

FIG. 3 is a flowchart of a content providing method according to an embodiment of the present invention. Referring to FIG. 3, unlike in FIG. 2, operation S210 of providing audio information is included after operation S200 of extracting the representative image. In the embodiment of FIG. 3, the description about the same configuration or effect as described with reference to FIG. 2 will be omitted.

As described above, when the subtitle page includes the audio information as well as the unit subtitle and the representative image, the subtitle helps the user's understanding of the image content.

In S210 of providing the audio information, the audio information providing unit 130 may provide the audio information corresponding to the subtitle interval of the image content. The audio information providing unit 130 may provide the audio information in the image content stored in the database 150 under the control of the subtitle page generating unit 110. At this time, the audio information providing unit 130 may provide audio information output during the audio interval of the image content corresponding to the subtitle interval.

Operation S210 of providing the audio information is illustrated in FIG. 3 as being performed after operation S200 of extracting the representative image, but operation S210 of providing the audio information may be performed before operation S200 of extracting the representative image.

Figure 4:
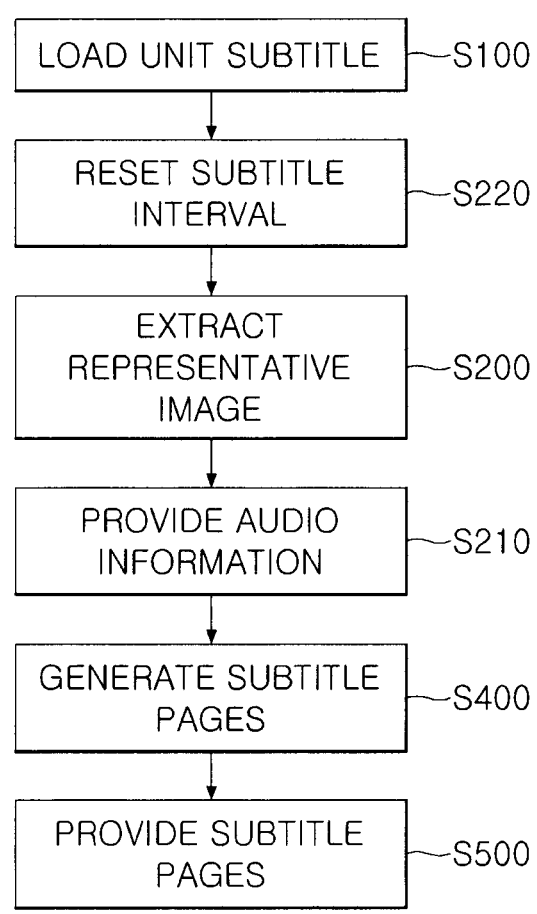
FIG. 4 is a flowchart of a content providing method according to an embodiment of the present invention.

FIG. 4 is a flowchart of a content providing method according to an embodiment of the present invention.

In general, the subtitle interval of the image content is often arbitrarily set by the subtitle producer. As described above, the audio information is provided corresponding to the subtitle interval. The subtitle interval is an interval arbitrarily set by the subtitle producer, and the speech or audio of characters output in the actual image content may not be matched in the display time. Therefore, when the corresponding image content is searched for in subtitle page units, the subtitle and the audio may not be synchronized.

For example, when the actual output time of the speed is 10 seconds but the subtitle producer inputs the subtitle so as to be displayed for a time shorter than 10 seconds, the subtitle page is switched according to the subtitle time arbitrarily input by the subtitle producer. Thus, when the subtitle page is switched, the page may be switched before the speech is all output, or the switched subtitle page may not output all audio corresponding to the subtitle. Therefore, the subtitle interval arbitrarily set by the subtitle producer needs to be reset according to the audio interval for which the actual audio is output.

Unlike in FIG. 3, it can be seen from FIG. 4 that the operation S220 of resetting the subtitle interval is included.

In operation S220 of resetting the subtitle interval, the audio information providing unit 130 may analyze the audio from the image content, set the audio interval according to the analysis result, and reset the subtitle interval corresponding to the audio interval.

More specifically, the audio information providing unit 130 may analyze the volume and the spectrum of a section in which the speed of the character is output. In addition, the audio information providing unit 130 may analyze a primary audio feature derived from the volume and the spectrum and a high-order audio feature derived from the primary audio feature.

The audio information providing unit 130 may set an audio interval, during which the audio is actually output, through the volume, spectrum, and audio features of the audio. The audio information providing unit 130 may classify a short audio interval into a speech interval and a non-speech interval through a learned classifier, such as a neural network, in relation to the similarity between the audio feature of the audio and the audio feature of the actual speech. The audio information providing unit 130 may set the start time and the end time of the audio interval by merging a plurality of adjacent short audio intervals classified through the above-described process.

The subtitle page generating unit 110 may reset the subtitle interval according to the set audio interval. More specifically, the subtitle page generating unit 110 may reset the start time of the subtitle interval with reference to the audio start time of the set audio interval, and reset the end time of the subtitle interval with reference to the reset audio end time.

For example, when the subtitle interval in the reproduction interval of the image content is set to 10 seconds to 15 seconds and the corresponding audio interval is identified as 8 seconds to 17 seconds, the subtitle interval is also changed to 8 seconds to 17 seconds.

After operation S220 of resetting the subtitle interval, operation S200 of extracting the representative image corresponding to the reset subtitle interval and operation S210 of providing the audio information may be performed.

Figure 5:
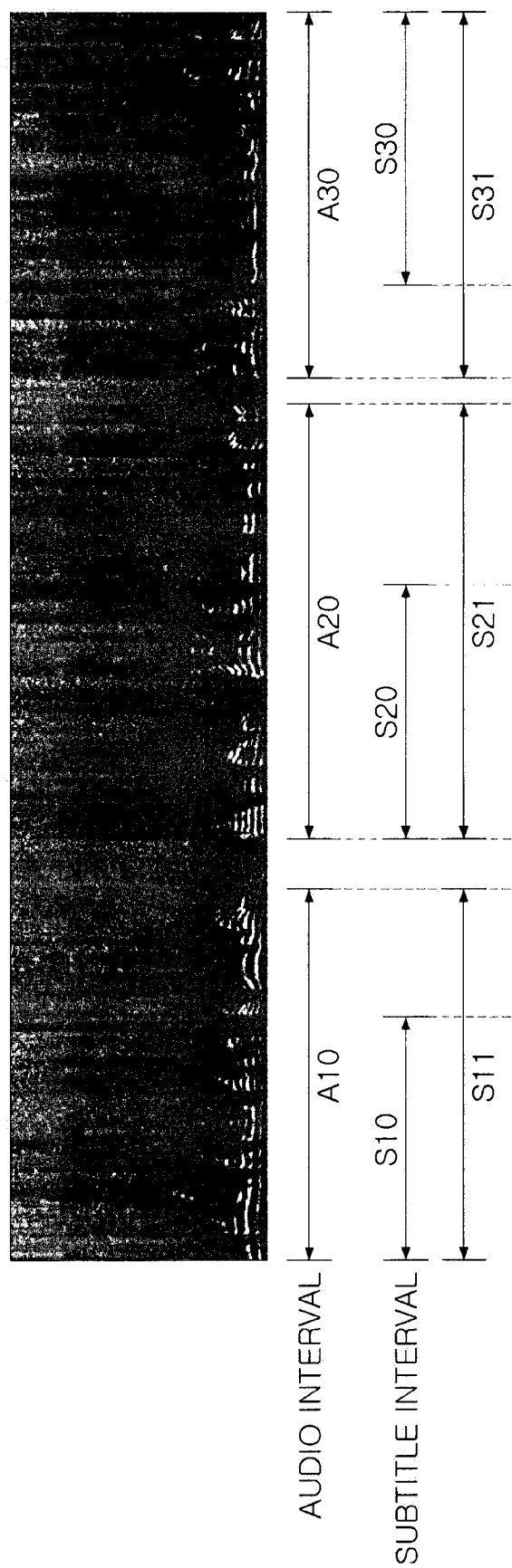
FIG. 5 is a diagram for describing a process of resetting a subtitle interval according to an embodiment of the present invention.

FIG. 5 is a diagram for describing the process of resetting the subtitle interval in the embodiment of FIG. 4. FIG. 5 illustrates an audio spectrum analysis result for an arbitrary interval of image content. The audio information providing unit 130 may set the audio interval by analyzing the audio spectrum. First to third audio intervals A10, A20, and A30 may be the reset audio intervals as the analysis result of the audio spectrum. It can be seen from the audio spectrum that a person's voice is not output between the first audio interval A10 and the second audio interval A20 and between the second audio interval A20 and the third audio interval A30.

The first to third subtitle intervals S10, S20, and S30 may be subtitle intervals prior to resetting. Fourth to sixth subtitle intervals S11, S21, and S31 refer to subtitle intervals in which the first to third subtitle intervals S10, S20, and S30 are reset according to the first to third audio intervals A10, A20, and A30.

Since the subtitle interval of the subtitle page is adjusted according to the audio interval, during which the actual audio is output, through the resetting of the subtitle interval, it is possible to mitigate unnaturalness due to inconsistency between subtitles and audios in the process of searching for the subtitle page.

Figure 6:
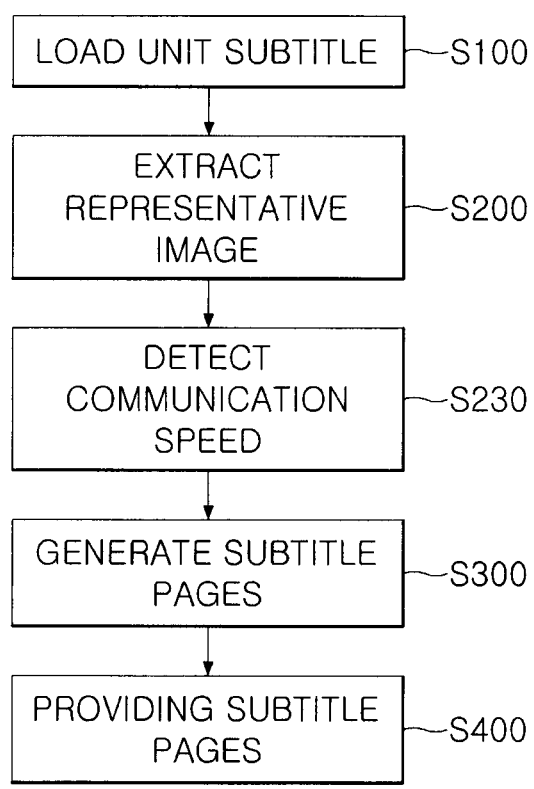
FIG. 6 is a flowchart of a content providing method according to an embodiment of the present invention.

FIG. 6 is a flowchart of a content providing method according to an embodiment of the present invention. Referring to FIG. 6, a content providing method may include operation S100 of loading a unit subtitle, operation S200 of extracting a representative image, operation S230 of detecting a communication speed, operation S300 of generating a plurality of subtitle pages, and operation S400 of providing a plurality of subtitle pages. In the embodiment of FIG. 6, the description of the configuration and effect redundant to the foregoing embodiment will be omitted.

The communication between the content providing terminal 200 and the content providing server 100 may be greatly influenced by a communication environment such as the state or distance of the Internet 10. In particular, when the content providing terminal 200 in a region in which the communication speed is limited communicates with the content providing server 100, it is difficult for the content providing server 100 to smoothly provide image content to the content providing terminal 200, and it is also difficult for the user of the content providing terminal 200 to grasp the contents of the image content. In such a case, the subtitle page including only the representative image and the unit subtitle is provided so that the user of the content providing terminal 200 searches for the contents of the image content through the subtitle page even when the communication speed between the content providing server 100 and the content providing terminal 200 is low.

In operation S230 of detecting the communication speed, the subtitle page generating unit 110 may detect the communication speed of the content providing terminal 200. The subtitle page generating unit 110 may detect and determine the communication speed of the content providing terminal 200 according to the amount of packets transmitted per hour, the region where the content providing terminal 200 attempts to access the content providing server 100, or the communication environment used for access, so as to measure the communication speed with the content providing terminal 200. In addition, the subtitle page generating unit 110 may determine the communication speed of the content providing terminal 200 by using the communication speed measured by another device or processor.

Operation S230 of detecting the communication speed may be performed before operation S300 of generating the plurality of subtitle pages, or may be performed before operation S200 of extracting the representative image or operation S100 of loading the unit subtitle unlike in FIG. 6.

In operation S300 of generating the plurality of subtitle pages, when the communication speed of the content providing terminal 200 is less than or equal to a predetermined value, the subtitle page may be combined by using the unit subtitle and the representative image.

Alternatively, in operation S300 of generating the plurality of subtitle pages, when the communication speed of the content providing terminal 200 exceeds a predetermined value, operation S210 of providing the audio information may be performed as in the embodiment of FIG. 3, and the subtitle page generating unit 110 may generate the subtitle page by using the unit subtitle, the representative image, and the audio information.

The predetermined value of the communication speed may be differently set according to the image quality or capacity of the image content. When the communication speed is less than or equal to the predetermined value, the subtitle page generating unit 110 may generate the subtitle page by using only the unit subtitle and the representative image, except for the audio information. The subtitle page generated in this manner may have lower capacity than the subtitle page in which the audio information is inserted together. By providing such subtitle pages to the content providing terminal 200, the subtitle page generating unit 110 may smoothly provide the subtitle page to the content providing terminal 200 even in a low speed communication environment.

In one embodiment, the content providing server 100 may generate a first type of a subtitle page including the unit subtitle and the representative image and a second type of a subtitle page including the unit subtitle, the representative image, and the audio, and then provide the first type of the subtitle page or the second type of the subtitle page to the content providing terminal 200 according to the communication speed of the content providing terminal 200 requesting the image content. In one embodiment, the first type of the subtitle page may include only the unit subtitle and the audio.

Figure 7:
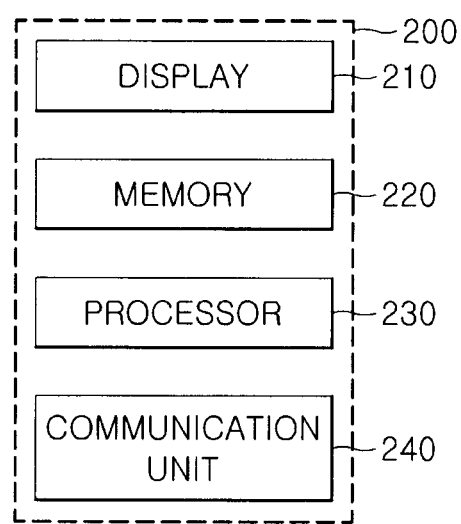
FIG. 7 is a block diagram illustrating a configuration of a content providing terminal according to an embodiment of the present invention.

FIG. 7 is a block diagram illustrating a configuration of a content providing terminal according to an embodiment of the present invention. Referring to FIG. 7, the content providing terminal 200 may include a display 210, a memory 220, a processor 230, and a communication unit 240.

The display 210 displays a subtitle page or image content to a user.

The memory 220 stores at least one program. The program stored in the memory 220 may include a subtitle page reproduction program.

The processor 230 may operate according to the control of the at least one program.

The communication unit 240 may receive the image content and at least one of the plurality of subtitle pages from the content providing server 100.

A process of searching for, by a user, a subtitle page through the display 210 of the content providing terminal 200 receiving the subtitle page from the content providing server 100 and utilizing the function supported through the subtitle page will be described with reference to FIG. 8.

Figure 8:
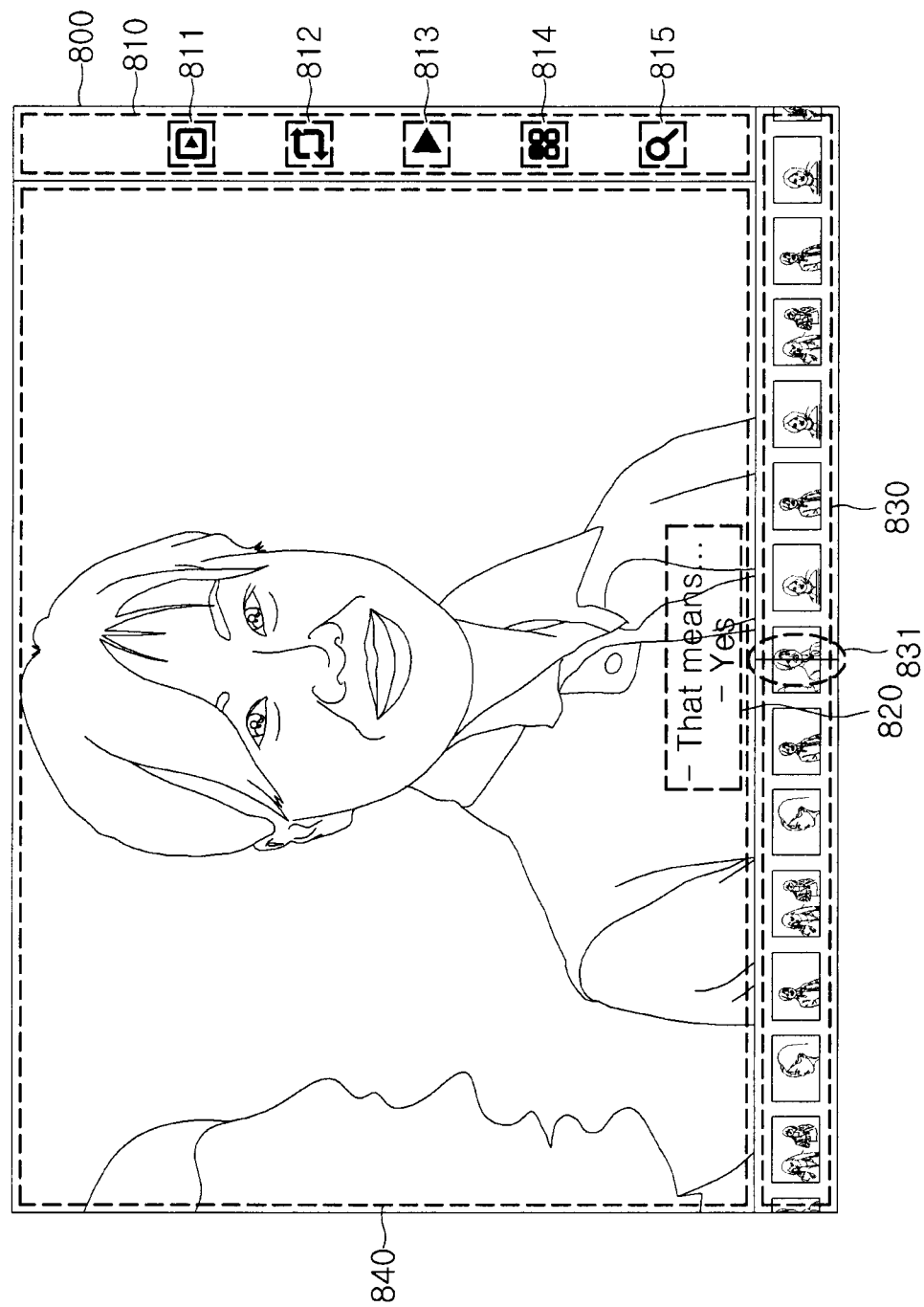
FIG. 8 is a diagram illustrating a screen on which a subtitle page is displayed on a content providing terminal, according to an embodiment of the present invention.

FIG. 8 is a diagram illustrating a screen on which a subtitle page is displayed on a content providing terminal, according to an embodiment of the present invention. FIG. 8 illustrates a subtitle page screen 800 displayed on the content providing terminal 200 when an arbitrary subtitle page is selected by the content providing terminal 200 receiving the subtitle page.

Referring to FIG. 8, the subtitle page screen 800 may include a function menu region 810, a subtitle display region 820, a scroll region 830, and an image display region 840 and may be displayed on the content providing terminal 200. Each region in the example of FIG. 8 is displayed as an example, and the position or size thereof may be changed according to a design method.

The function menu region 810 may be a region in which menus for performing a function for assisting a user in viewing a subtitle page are arranged. The plurality of subtitle pages, which are generated by the subtitle page generating unit 110 and provided to the content providing terminal 200, may be set to perform the function determined according to the user's selection.

The function menu region 810 may include a first function menu 811 for the processor 230 to receive an image switch request from the user, a second function menu 812 for the processor 230 to receive a reproduction option control from the user, a reproduction/stop function menu 813 for the processor 230 to receive a reproduction/stop request of the audio information output from the subtitle page, a third function menu 814 for the processor 230 to receive a screen division function from the user, and a fourth function menu 815 for the processor 230 to receive a subtitle search or translation request from the user.

The sizes and positions of the respective function menus 811 to 815 may be variously changed according to a design method.

The subtitle interval included in the subtitle page output on the display may be displayed on the subtitle display region 820. Thumbnail images (for example, representative images) of the plurality of subtitle pages, which can be output by the content providing terminal 200, may be displayed in the scroll region 830. The representative image of the subtitle page, which can be output to the display, may be displayed on the image display region 840. The thumbnail image may be generated to be displayed with a size smaller than that of the representative image in response to the extraction of the representative image by the image information extracting unit 120.

The processor 230 may move the adjacent subtitle page including the subtitle interval to replace the current subtitle page displayed on the display 210 in response to a page movement request from the user, and display the moved subtitle page on the display 210.

More specifically, even before the completion of the audio output of the subtitle page which is currently displayed on the display 210 and in which the audio information is output, the processor 230 may display another subtitle page adjacent to the subtitle interval on the display 210.

The page movement request may be performed by selecting or scrolling a partial region of the display 210. For example, the right half of the image display region 840 is a region for moving to a subtitle page having a next subtitle interval, and the left half of the image display region 840 may be a region for moving to a subtitle page having a previous subtitle interval. The user may select a portion of the image display region 840 to move to a subtitle page indicated by the portion, thereby viewing another subtitle page. In addition, the page movement request may be performed by scrolling from one point to another point so as to give a feeling of turning a page in a printed book.

The processor 230 may reproduce the image content from the time corresponding to the subtitle interval of the subtitle page displayed on the display 210 in response to the image switch request from the user.

The image switch request is a function that can be used when the user wants to directly view the image content from the subtitle interval corresponding to the subtitle page in viewing the subtitle page.

When the user selects the first function menu 811, the processor 230 may reproduce the image content from the subtitle interval start time of the subtitle page displayed on the display 210.

Unlike the page switch request, the processor 230 reproducing the image content may display a subtitle page corresponding to an arbitrary reproduction time on the display 210 in response to the subtitle page switch request received from the user at the arbitrary reproduction time of the image content.

More specifically, the processor 230 may display, on the display, a subtitle page corresponding to a subtitle interval including an arbitrary reproduction time or a reproduction time earlier than the arbitrary reproduction time in response to the page switch request.

For example, when the user makes a page switch request while the image content is being displayed, the processor 230 may display, to the user, a subtitle page including the reproduction time of the image content as the subtitle interval. In addition, when there is no subtitle page including the reproduction time of the image content as the subtitle interval, the processor 230 may display, to the user, a subtitle page including a subtitle interval including the latest reproduction time among subtitle pages including the reproduction time earlier than the arbitrary reproduction time of the image content as the subtitle interval.

To this end, the processor 230 may have a function of receiving the page switch request from the user when the image content is reproduced.

The user may freely switch the view of the image content and the view of the subtitle page through the image switch request and the page switch request. Therefore, in the switch process, the reproduction time is switched to the corresponding reproduction time according to the progress level of the content, thereby facilitating the user's understanding of the content.

The processor 230 may control the method of outputting the audio information in response to the reproduction option control request from the user. More specifically, the processor 230 may perform one of a first reproduction mode for repeatedly outputting audio information of the subtitle page displayed on the display 210 in response to the reproduction option control request, a second reproduction mode for stopping outputting the audio information after the audio information of the subtitle page displayed on the display 210 is output, a third reproduction mode for moving a subtitle page having a next subtitle interval order of the subtitle page displayed on the display after the audio information of the subtitle page displayed on the display 210, and displaying the moved subtitle page.

The user may alternately select the first to third reproduction modes by repeatedly selecting the second function menu 812. The user may control the reproduction option differently depending on their understanding, thereby obtaining a high learning effect.

When the user requests a screen division function, the processor 230 may increase the number of main pages output to the display 210 to two or more. The user may repeatedly select the third function menu 814 to change the number of main pages output to the display 210 to a preset number, such as two, three, or four.

The processor 230 may reproduce or stop the audio information output in the substitute page in response to the reproduction/stop request from the user.

The processor 230 may search unit subtitles of a plurality of subtitle pages for a search word received from the user in response to the subtitle search request from the user, and display the search result on the display 210.

The processor 230 may search the unit subtitles of the entire subtitle pages for a subtitle matching the search word input from the content providing terminal 200. The subtitle page generating unit 110 may notify the content providing terminal 200 of the found subtitle and the subtitle page at which the subtitle is located, and when there is the found subtitle page, may provide a link capable of directly moving to the subtitle page.

The processor 230 may translate at least one word selected among unit subtitles of the subtitle page displayed on the display 210 in response to the subtitle translation request from the user, and display the translation result on the display 210.

The processor 230 may access an internal translation program or an external translation program linked to the subtitle-translation-requested word online or offline, request the translation of the word, and provide the translation result to the display 210.

The subtitle search/translation function in FIG. 8 may be requested by the fourth function menu 815, but unlike in FIG. 8, the region for the subtitle search request and the subtitle translation request may be separately displayed.

The subtitle display region 820 is a region in which the unit subtitle of the subtitle page displayed on the content providing terminal 200 is displayed. The subtitle display region 820 may be located in a region overlapping the inside or part of the image display region 840. Therefore, the subtitle display region 820 may be displayed to overlap the representative image displayed through the image display region 840. In addition, the subtitle display region 820 may be located outside the image display region 840, and so that the image display region 840 and the subtitle display region 820 are separately displayed.

The representative images of the plurality of subtitle pages may be arranged in the scroll region 830 in the form of thumbnails. The thumbnails of the subtitle pages may be set with a size smaller than that of the representative image according to the size of the scroll region 830. The thumbnail of the representative image of the current subtitle page displayed on the display 210 may be located in a central portion 831 of the scroll region 830. That is, the subtitle page which is being viewed by the current user may be located in the central portion 831 of the scroll region 830. The user may select one of the thumbnail images of the subtitle page located in the scroll region 830 to request the processor 230 for directly moving to the corresponding subtitle page. The thumbnail image located in the scroll region 830 may be a thumbnail image of a subtitle page having a subtitle interval of an order adjacent to the subtitle page displayed on the content providing terminal 200, and the number of thumbnail images included in the scroll region 830 may be variable.

The image display region 840 may be a region in which the representative image of the subtitle page displayed on the display 210 is displayed. The image display region 840 may be set to include the entire or partial region of the subtitle page screen 800.

Figure 9:
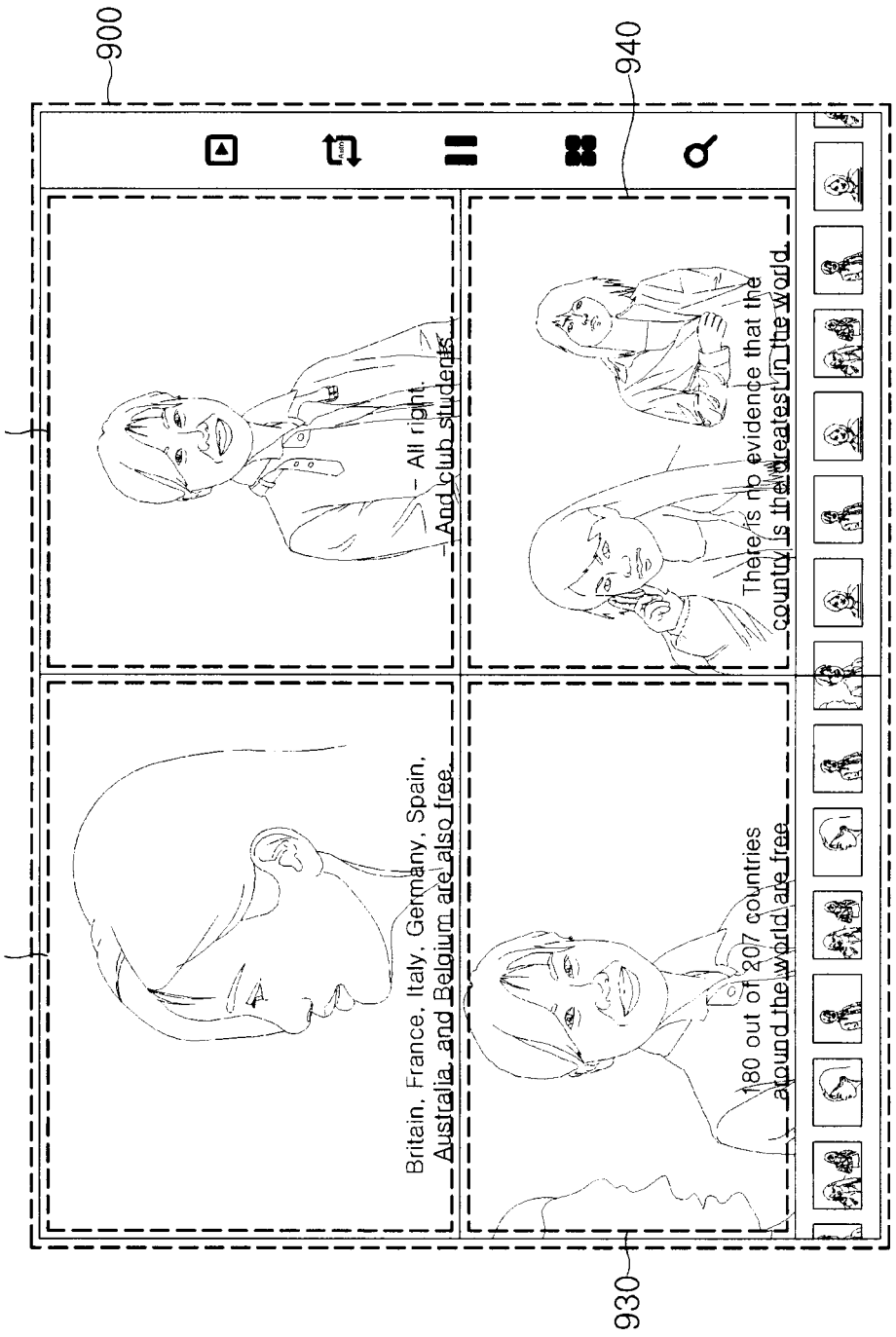
FIG. 9 is a diagram illustrating another screen on which a subtitle page is displayed on a content providing terminal, according to an embodiment of the present invention.

FIG. 9 is a screen showing four subtitle pages simultaneously displayed on the display 210.

FIG. 9 is a diagram for describing a case where a screen division function described with reference to FIG. 8 is performed. Unlike the subtitle page screen 800 illustrated in FIG. 8, the screen 900 illustrated in FIG. 9 may be displayed by four subtitle pages 910 to 940. The screen 900 illustrated in FIG. 9 may include the first subtitle page 910, the second subtitle page 920, the third subtitle page 930, and the fourth subtitle page 940. The first to fourth subtitle pages 910 to 940 may be arranged according to the order of the subtitle pages. When the screen division function is performed, the first to fourth subtitle pages 910 to 940 may sequentially output audio information according to the order of the subtitle intervals. Since FIG. 9 is an example for describing the screen division function, various numbers of subtitle pages other than the four subtitle pages as illustrated in FIG. 9 may be displayed on one screen according to the design of the screen division function.

Figure 10:
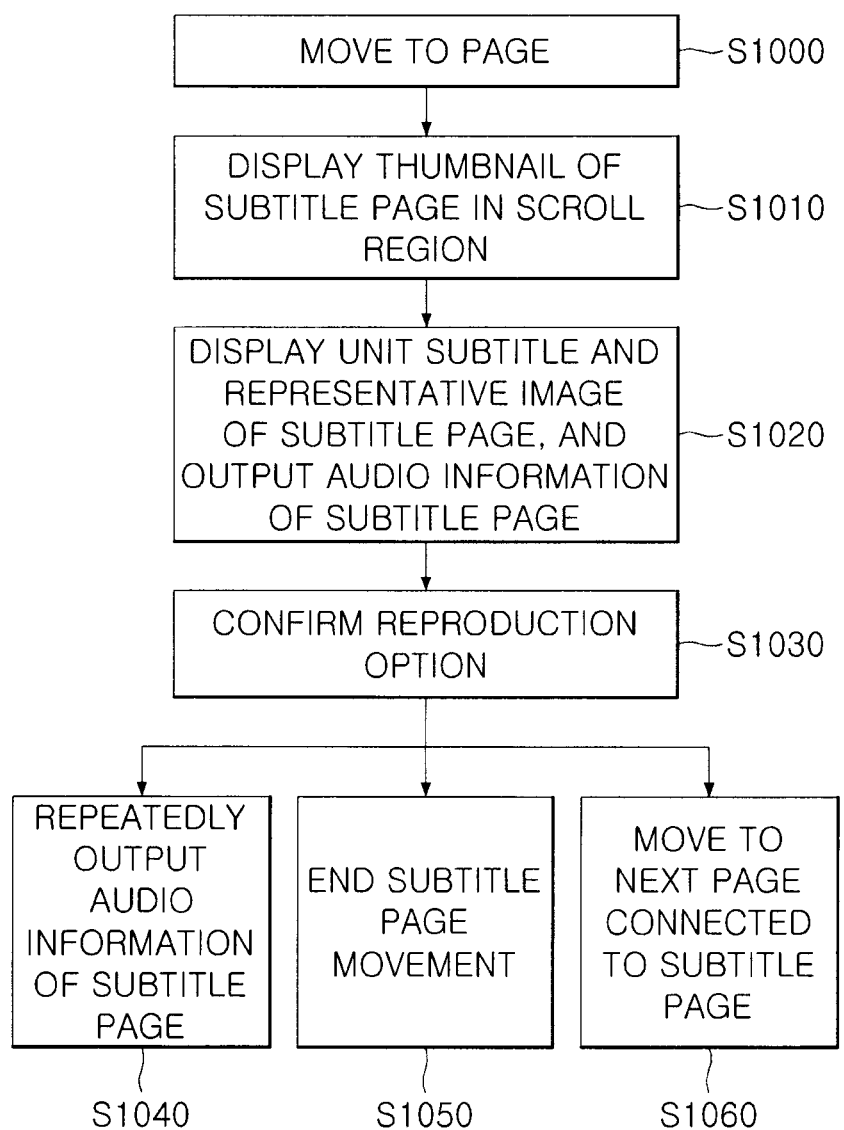
FIG. 10 is a flowchart of a process of controlling a reproduction option for a plurality of subtitle pages, according to an embodiment of the present invention.

FIG. 10 is a flowchart of a process of controlling a reproduction option for a plurality of subtitle pages, according to an embodiment of the present invention.

The processor 230 may move to a specific subtitle page in response to a page movement request (S1000). The processor 230 may display a thumbnail of a subtitle page in the scroll region 830. The processor 230 may display a unit subtitle and a representative image of the subtitle page and output audio information of the subtitle page (S1020). The processor 230 may confirm a reproduction option of the subtitle page (S1030). The processor 230 may repeatedly output the audio information of the subtitle page according to a first reproduction mode by the reproduction option (S1040), may end the subtitle page movement after the end of the output of the audio information according to a second reproduction mode (S1050), and may move to a subtitle page including a subtitle interval of a next order of the subtitle page displayed on the display 210 according to a third reproduction mode (S1060).

The above-described embodiments may be embodied as computer programs and may be implemented by general-purpose digital computers that execute the computer programs by using a computer-readable recording medium.

Figure 11:
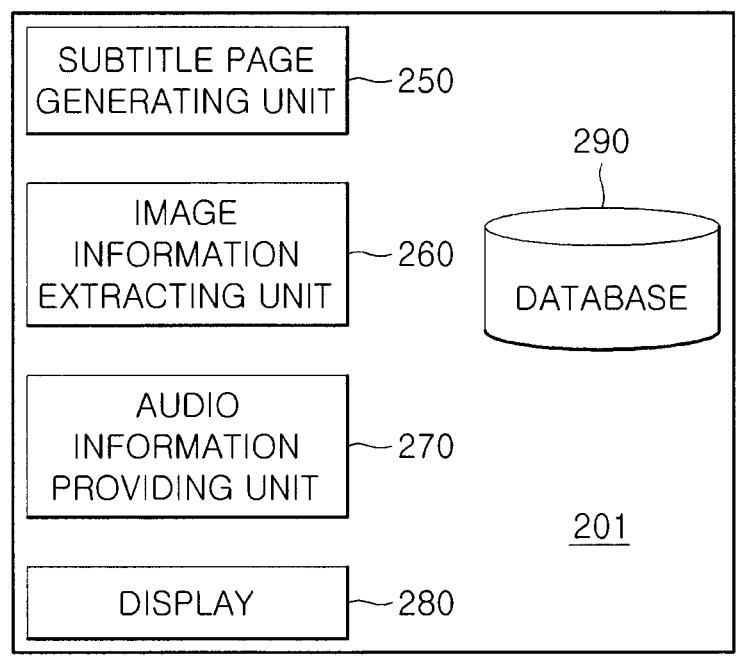
FIG. 11 is a block diagram illustrating a configuration of a content providing terminal according to an embodiment of the present invention.

FIG. 11 is a block diagram illustrating a configuration of a content providing terminal according to an embodiment of the present invention.

Referring to FIG. 11, the content providing terminal 201 may include a subtitle page generating unit 250, an image information extracting unit 260, an audio information providing unit 270, a display 280, and a database 290.

The subtitle page generating unit 250, the image information extracting unit 260, and the audio information providing unit 270 may be part of a processor of the content providing terminal 201, or may be a module, a function, or a unit performed by the processor.

Unlike the previous embodiment, the content providing terminal 201 illustrated in FIG. 11 may generate a plurality of subtitle pages from image content stored in the database 290 provided inside the content providing terminal 201 or connected to the content providing terminal 201 offline, and provides the plurality of subtitle pages to the user.

The content providing terminal 201 may access the image content prestored in the database 290 connected to the server offline, even though not connected to the server online, and generate the plurality of subtitle pages. In this case, since the plurality of subtitle pages can be generated offline without the process of connected to the server and transmitting and receiving data, the plurality of subtitle pages for the image content can be generated without delay caused by online connection or cost for downloading data.

That is, the content providing terminal 201 of FIG. may be understood as the configuration in which the subtitle page generating unit 110, the image information extracting unit 120, and the audio information providing unit 130 provided in the content providing server 100 of FIG. 1 are included in the content providing terminal 200. Therefore, in the embodiment of FIG. 11, the description of the same functions or effects as the embodiments will be omitted.

The subtitle page generating unit 250 may generate the subtitle page including the subtitle interval, during which the subtitle is displayed in the image content, and the representative image extracted the image content. The subtitle page generating unit 250 may generate a plurality of subtitle pages corresponding to a plurality of subtitle intervals dividing the image content, and display the plurality of subtitle pages to the user through the display 280.

Like the subtitle page generating unit 110 of the above-described embodiment, the subtitle page generating unit 250 may generate the subtitle page through the unit subtitle and the representative image. In addition, the subtitle page generating unit 250 may generate the subtitle page by further including audio information as described below. The number of subtitle pages generated by the subtitle page generating unit 250 is repeated as many as the number of subtitle intervals of the image content, thereby generate a plurality of subtitle pages.

Unlike the subtitle page generating unit 110 of FIG. 1, the subtitle page generating unit 250 may directly display the plurality of generated subtitle pages on the display 280 included in the content providing terminal 201, without transmitting the plurality of generated subtitle pages to a separate content providing terminal 200 through the Internet 10. Since the process by which the subtitle page generating unit 250 generates the subtitle page is the same as described above, the description thereof will be omitted.

The display 280 displays the generated subtitle page or image content to the user.

The database 290 may be information storage hardware, such as hard disk drive (HDD), solid state drive (SSD), random access memory (RAM), and flash memory. The database 290 may store the image content and the subtitle information, and may be mounted on the content providing terminal 201 or mounted on a separate device, and may be connected to the content providing terminal 201 offline.

Figure 12:
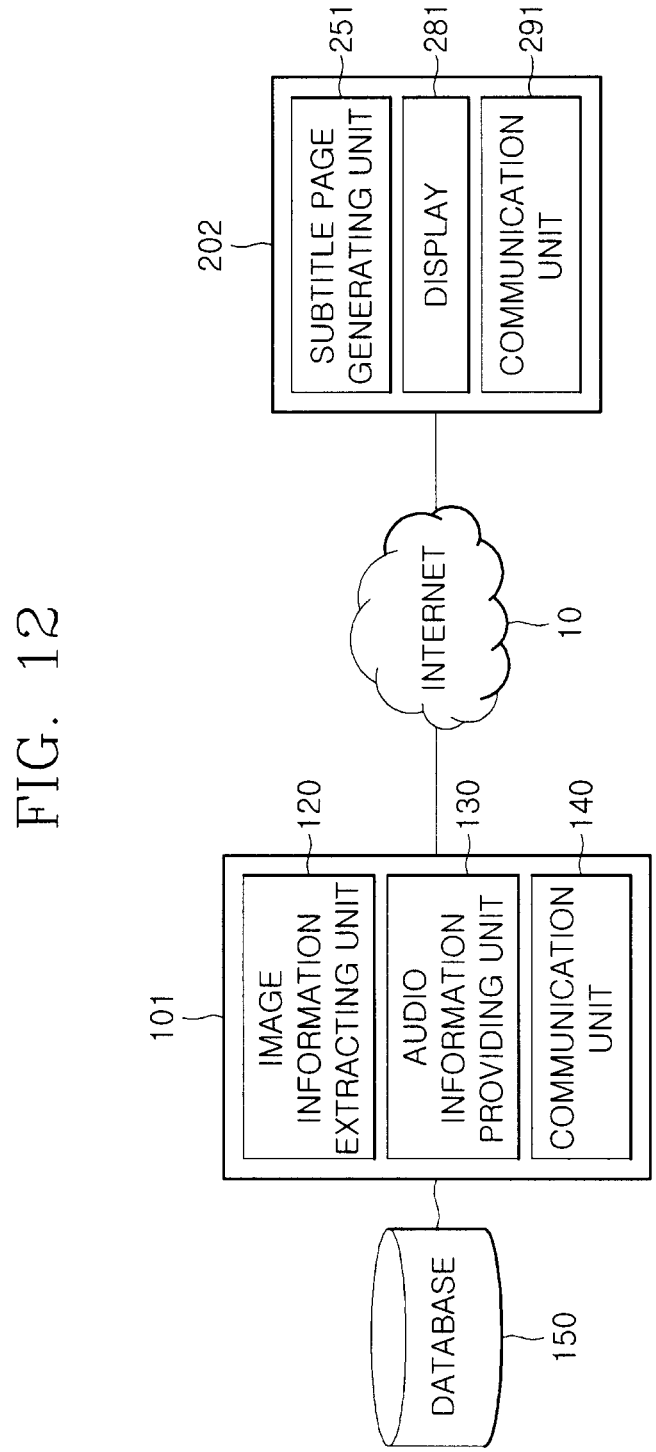
FIG. 12 is a block diagram illustrating a configuration of a content providing terminal and a content providing server according to an embodiment of the present invention.

FIG. 12 is a block diagram illustrating a configuration of a content providing terminal and a content providing server according to an embodiment of the present invention.

The image information extracting unit 120, the audio information providing unit 130 and the communication unit 140 may be part of a processor of a content providing server 101, or may be a module, a function, or a unit performed by the processor.

The subtitle page generating unit 251 and the communication unit 251 may be part of a processor of the content providing terminal 202, or may be a module, a function, or a unit performed by the processor.

Unlike the previous embodiment, in the embodiment of FIG. 12, the content providing server 101 may generate source information used to generate a subtitle page and provide the generated source information to the content providing terminal 202, and the content providing terminal 202 may generate a subtitle page by using the source information.

That is, the image content and the subtitle information may be stored in the database 150 of the content providing server 101, and the content providing server 101 may provide the source information used to generate the subtitle page by the content providing terminal 202 in response to a source information request from the content providing terminal 202. The content providing terminal 202 may generate the plurality of subtitle pages by using the source information received from the content providing server 101, and display the plurality of generated subtitle pages to the user through the display 281.

The content providing terminal 202 may request the content providing server 101 for source information necessary for generating the subtitle page. The content providing server 101 may generate the source information in response to the source information request from the content providing terminal 202 by using the image content stored in the database 150 of the content providing server 101. The source information may be information including at least one of a representative image and an audio extracted from the subtitle information and the image content.

The image information extracting unit 120 may load subtitle information from the database 150, confirm a plurality of subtitle intervals of the image content, and extract the representative image corresponding to each subtitle interval.

The audio information providing unit 130 may load subtitle information from the database 150, confirm a plurality of subtitle intervals of the image content, and provide audio information corresponding to each subtitle interval.

The audio information providing unit 130 may provide audio information corresponding to the subtitle interval included in the source information request among pieces of audio information included in the image content or existing in the form of a separate file distinguishing from the image content.

Since the method by which the image information extracting unit 120 extracts the representative image from the image content according to the subtitle interval or the process by which the audio information providing unit 130 provides the audio information according to the subtitle interval are the same as described above, the description thereof will be omitted.

Referring to FIG. 12, the content providing terminal 202 may include a subtitle page generating unit 251, a display 281, and a communication unit 291. The content providing server 101 connected to the content providing terminal 202 through the Internet 10 may include an image information extracting unit 120, an audio information providing unit 130, and a communication unit 140.

The subtitle page generating unit 251 accesses the content providing server 101 through the communication unit 291 connected to the Internet 10, and makes a source information request. At this time, the source information request may be performed in such a manner that the user accesses the content providing server 101 by using the content providing terminal 202 and requests the subtitle page.

The source information request may include a request for unit subtitles, representative images, and audio information with respect to the plurality of entire subtitle pages, and may include a request for a representative image or audio information with respect to a subtitle page selected by the user among the plurality of subtitle pages.

The content providing server 101 receiving the source information request may provide the subtitle information stored in the database 150 to the content providing terminal 202 through the communication unit 140. In addition, the content providing server 101 may provide all or part of at least one of the representative image and the audio information to the content providing terminal 202 according to the contents of the source information request.

The image information extracting unit 120 may confirm the subtitle interval of the subtitle information in response to the source information request, extract the representative image corresponding to the subtitle interval from the image content, and provide the extracted representative image to the content providing terminal 202.

The audio information providing unit 130 may confirm the subtitle interval of the subtitle information in response to the source information request, confirm the audio information corresponding to the subtitle interval, and provide the audio information to the content providing terminal 202.

The subtitle page generating unit 251 may set the order of a plurality of subtitle pages according to the order of subtitle pages.

The source information provided to the content providing terminal 202 by the content providing server 101 may be different according to the source information request.

An example in which the source information request requests the unit subtitles corresponding to the plurality of subtitle intervals, the representative images corresponding to the plurality of subtitle intervals, and the audio information corresponding to the plurality of subtitle intervals will be described.

In this case, the content providing server 101 may provide all pieces of information necessary for the content providing terminal 202 to generate the subtitle page in response to the source information request from the content providing terminal 202. Therefore, the content providing terminal 202 may previously generate all subtitle pages corresponding to the plurality of subtitle intervals. In this manner, when the user moves between the subtitle pages in the process of searching for the subtitle pages, delay may be minimized without any additional download.

In addition, another example in which the source information request requests the unit subtitles corresponding to the plurality of subtitle intervals, the representative images corresponding to the subtitle interval of the subtitle page selected by the user among the plurality of subtitle intervals, and the audio information corresponding to the subtitle interval of the subtitle page selected by the user will be described.

In this case, the content providing server 101 may provide only some pieces of information necessary for the content providing terminal 202 to generate the subtitle page in response to the source information request from the content providing terminal 202. Therefore, the content providing terminal 202 may download only the representative image and the audio information for the subtitle page, which is selected by the user and is to be viewed, from the content providing server 101. In this manner, the user need not wait until the content providing terminal 202 downloads all pieces of information for configuring the plurality of subtitle pages, and only information about the selected subtitle page is downloaded, thereby reducing the amount of data used.

In addition, an example in which the source information request requests the subtitle interval of the subtitle page selected by the user, the representative image corresponding to the subtitle interval of the subtitle page having the order adjacent to the selected subtitle page, the audio information corresponding to the subtitle interval of the subtitle page having the order adjacent to the selected subtitle page will be described.

In this case, the content providing server 101 may provide only some pieces of information necessary for the content providing terminal 202 to generate the subtitle page in response to the source information request from the content providing terminal 202. However, unlike the above-described example, since the content providing terminal 202 previously secures information about the subtitle page of the order adjacent to the subtitle page selected by the user, delay may be mitigated when the user switches to the subtitle page of the order immediately following the subtitle page selected by the user or immediately preceding the subtitle page selected by the user.

The source information request may include a request for, when the subtitle page selected by the user among the plurality of subtitle pages is displayed on the display, the thumbnail images of the selected subtitle page and the subtitle pages of the order adjacent to the selected subtitle page. The thumbnail image may be an image corresponding to the representative image of each subtitle page displayed in the scroll region 830 described with reference to FIG. 8. When the source information request including the thumbnail image is received, the image information extracting unit 120 may generate a thumbnail image displayed with a size smaller than the representative image in response to the extraction of the representative image.

The above-described source information request is merely an example. In addition, different types of source information request may be suggested according to the environments of the content providing terminal 202 and the content providing server 101 or the setting of the administrator.

Figure 13:
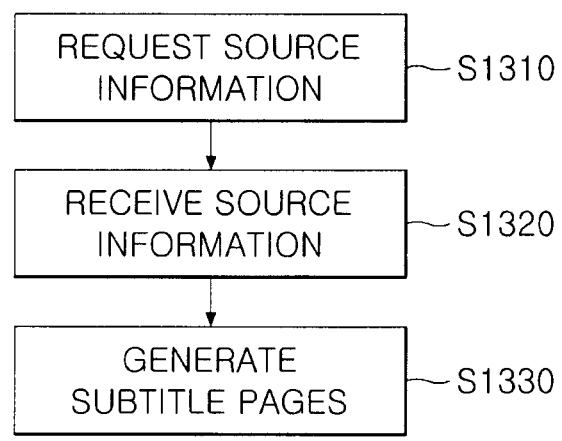
FIG. 13 is a flowchart of a content providing method according to an embodiment of the present invention.

FIG. 13 is a flowchart of a content providing method according to an embodiment of the present invention.

Referring to FIG. 13, the content providing terminal 202 of FIG. 12 generates the subtitle page. The content providing method of FIG. 13 may include operation S1310 of requesting source information, operation S1320 of receiving the source information, and operation S1330 of generating a plurality of subtitle pages.

In operation S1310 of requesting the source information, the content providing terminal 202 may request source information including the unit subtitle of the subtitle interval in which the subtitle is displayed in the image content and the representative image extracted from the image content corresponding to the subtitle interval from the content providing server 101.

In operation S1320 of receiving the source information, the content providing terminal 202 may receive the source information from the content providing server 101.

In operation S1330 of generating the plurality of subtitle pages, the content providing terminal 202 may generate a plurality of subtitle pages corresponding to a plurality of subtitle intervals dividing the image content by using the source information, and provides the generated subtitle pages to the user.

The image information extracting unit 120 of the content providing terminal 202 may extract the representative image corresponding to the subtitle interval in the image content.

Figure 14:
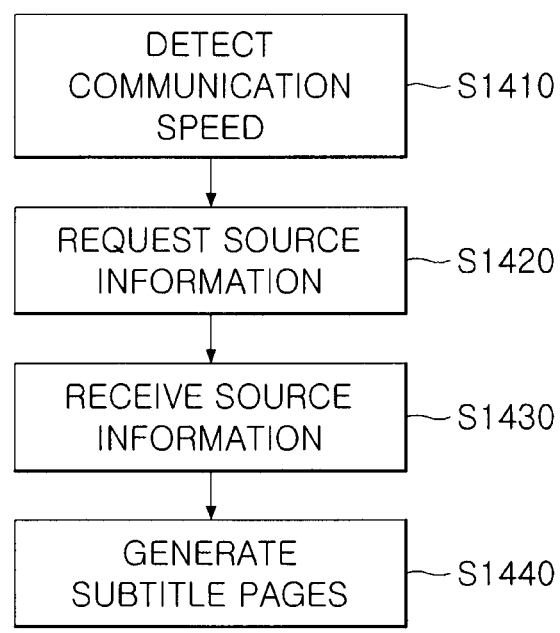
FIG. 14 is a flowchart of a content providing method according to an embodiment of the present invention.

FIG. 14 is a flowchart of a content providing method according to an embodiment of the present invention.

FIG. 14 illustrates an embodiment in which, when generating the subtitle page, the content providing terminal 202 of FIG. 12 may detect a communication speed and change the contents of a source information request corresponding to the detection result. Referring to FIG. 14, the content providing method may include operation S1410 of detecting the communication speed, operation S1420 of requesting the source information, operation S1430 of receiving the source information, and operation S1440 of generating a plurality of subtitle pages.

The communication between the content providing terminal 202 and the content providing server 101 may be greatly influenced by a communication environment such as the state or distance of the Internet 10. In particular, when the content providing terminal 202 in a region in which the communication speed is limited communicates with the content providing server 101, it is difficult for the content providing server 101 to smoothly provide image content to the content providing terminal 202, and it is also difficult for the user of the content providing terminal 202 to grasp the contents of the image content. In such a case, the subtitle page including only the representative image and the unit subtitle is provided so that the user of the content providing terminal 202 searches for the contents of the image content through the subtitle page even when the communication speed between the content providing server 101 and the content providing terminal 202 is low.

In operation S1410 of detecting the communication speed, the content providing terminal 202 may detect the communication speed with the content providing server 101 and request the content providing server 101 for the source information according to the detected communication speed. More specifically, the content providing terminal 202 may detect and determine the communication speed of the content providing terminal 202 according to the amount of packets transmitted per hour, the region where the content providing terminal 202 attempts to access the content providing server 101, or the communication environment used for access, so as to measure the communication speed with the content providing server 101. In addition, the content providing terminal 202 may determine the communication speed of the content providing terminal 202 by using the communication speed measured by another device or processor.

When the detected communication speed is less than or equal to a predetermined speed, the content providing terminal 202 may request only source information about the unit subtitle and the representative image, or request only source information about the unit subtitle and the audio information (S1420).

The predetermined value, which is the reference of the communication speed, may be differently set according to the image quality or capacity of the image content. The subtitle page generating unit 251 of the content providing terminal 202 may receive source information provided in response to the source information request (S1430), and generate the subtitle page by using only the received source information (S1440). The subtitle page generated in this manner may have lower capacity than the subtitle page in which the audio information is inserted together. In this manner, the subtitle page may be smoothly provided to the content providing terminal 200 even in a low speed communication environment.

According to one or more embodiments of the present invention, the subtitle page is generated through the subtitle information and the representative image extracted from the image content, and the search of the image content is facilitated through the plurality of subtitle pages, thereby enabling the user to view the image content according to the level of the user's understanding.

According to one or more embodiments of the present invention, the user may view the contents of the image content even in an environment in which the transmission speed required in data communication is limited.

A medium may continuously store a computer-executable program, or may temporarily store the computer-executable program for execution or download. In addition, the medium may be a variety of recording means or storage means in the form of single hardware or a combination of a plurality of hardware, but is not limited to a medium directly connected to any computer system. For example, the medium may be distributed on a network. The medium may be configured to store program instructions, and example of the medium may include magnetic media (e.g., hard disk, floppy disk, magnetic tape, etc.), optical media (e.g., compact disc-read-only memory (CD-ROM), digital versatile disk (DVD), etc.), magneto-optical media (e.g., floptical disk, etc.), and read-only memory (ROM), random access memory (RAM), and flash memory. Another example of the medium may include a recording medium or a storage medium managed by an application store that distributes applications or a site or a server that supplies or distributes a variety of other software.

The above description is merely illustrative of the technical idea of the present invention, and various modifications and changes may be made thereto by those skilled in the art without departing from the essential characteristics of the present invention. Therefore, the embodiments of the present invention are not intended to limit the technical spirit of the present invention but to illustrate the technical idea of the present invention, and the technical spirit of the present invention is not limited by these embodiments. The scope of protection of the present invention should be interpreted by the appending claims, and all technical ideas within the scope of equivalents should be construed as falling within the scope of the present invention.

What is claimed is:

1. A content providing server comprising:
a subtitle page generating unit configured to generate a subtitle page including a unit subtitle of a subtitle interval, during which a subtitle is displayed in image content, a representative image and audio information extracted from the image content;
an image information extracting unit configured to extract the representative image corresponding to the subtitle interval in the image content; and
an audio information providing unit configured to provide audio information corresponding to the subtitle interval in the image content, wherein the audio information refers to an audio output during each subtitle interval,
wherein the subtitle page generating unit generates a plurality of subtitle pages corresponding to a plurality of subtitle intervals dividing the image content, and display the plurality of subtitle pages to a user of a content providing terminal,
wherein the audio information providing unit analyzes an audio feature of the image content and sets a speech interval during which the voice of a character is output in the image content, and
the subtitle page generating unit resets the subtitle interval corresponding to the speech interval,
wherein the audio information providing unit classify short audio intervals into a speech interval and a non-speech interval, relative to the similarity between the audio feature of the actual speech,
wherein the subtitle page generating unit resets the start time of the subtitle interval with reference to the speech start time of the speech interval, and resets the end time of the subtitle interval with reference to the speech end time of the speech interval.

2. The content providing server of claim 1, wherein the subtitle page generating unit sets an order of the plurality of subtitle pages according to an order of the subtitle intervals.

3. The content providing server of claim 1, wherein, when a communication speed of the content providing terminal is less than or equal to a predetermined value, the subtitle page generating unit generates a subtitle page including the unit subtitle and the representative image, or generates a subtitle page including the unit subtitle and the audio information.

4. A content providing terminal comprising:
a display;
a memory configured to store at least one program; and
a processor configured to operate according to the control of the at least one program,
wherein the processor displays, on the display, one of a plurality of subtitle pages corresponding to each subtitle interval, during which a subtitle is displayed in image content, according to a reproduction order of the image content,
the plurality of subtitle pages includes a first display region for displaying a unit subtitle corresponding to the subtitle interval and a second display region for displaying a representative image corresponding to the subtitle interval, wherein said first display region is on said second display region, and
the representative image is extracted from the subtitle interval of the image content,
wherein the processor directly reproduces the image content from time corresponding to the subtitle interval of the subtitle page displayed on the display in response to an image switch request from a user,
wherein the processor displays, on the display, a subtitle page corresponding to an arbitrary reproduction time in response to a subtitle page switch request from a user at the arbitrary reproduction time of the image content.

5. The content providing terminal of claim 4, wherein the processor moves a subtitle page including a subtitle interval adjacent to a subtitle page currently displayed on the display in response to a page movement request from a user, and displays the moved subtitle page on the display.

6. The content providing terminal of claim 4, wherein the processor reproduces the image content from a subtitle interval start time of the subtitle page displayed on the display in response to the image switch request.

7. The content providing terminal of claim 4, wherein the processor displays, on the display, a subtitle page corresponding to a subtitle interval including an arbitrary reproduction time or a reproduction time earlier than the arbitrary reproduction time in response to the subtitle page switch request.

8. The content providing terminal of claim 4, wherein the plurality of subtitle pages includes audio information corresponding to the subtitle interval, and
the audio information is provided corresponding to the subtitle interval of the image content.

9. The content providing terminal of claim 8, wherein the processor controls a method of outputting the audio information in response to a reproduction option control request from a user.

10. The content providing terminal of claim 9, wherein the processor performs, in response to the reproduction option control request, one reproduction mode selected from:
a first reproduction mode for repeatedly outputting audio information of the subtitle page displayed on the display;
a second reproduction mode for stopping outputting the audio information after the audio information of the subtitle page displayed on the display is output; and
a third reproduction mode for, when the audio information of the subtitle page displayed on the display is output, moving to a subtitle page next to the subtitle page displayed on the display and displaying the moved subtitle page.

11. The content providing terminal of claim 4, wherein the processor changes the number of subtitle pages, which are displayed on the display in response to a screen division request, to two or more.

12. The content providing terminal of claim 11, wherein the processor arranges two or more subtitle pages, which are displayed on the display in response to the screen division request, according to an order of the subtitle interval, and audio information included in to two or more subtitle pages is output according to the order of the subtitle interval.

13. The content providing terminal of claim 4, wherein the processor searches unit subtitles of the plurality of subtitle pages for a search word received from the user in response to a subtitle search request from a user, and displays the search result on the display.

14. The content providing terminal of claim 4, wherein the processor translates one or more words selected from the unit subtitle of the subtitle page displayed on the display in response to a subtitle translation request from a user, and displays the translation result on the display.

15. A content providing terminal comprising:
a display;
a subtitle page generating unit configured to generate a subtitle page including a unit subtitle of a subtitle interval, during which a subtitle is displayed in image content, a representative image and audio information extracted from the image content;
an image information extracting unit configured to extract the representative image corresponding to the subtitle interval in the image content; and
an audio information providing unit configured to provide audio information corresponding to the subtitle interval in the image content, wherein the audio information refers to an audio output during each subtitle interval,
wherein the subtitle page generating unit generates a plurality of subtitle pages corresponding to a plurality of subtitle intervals dividing the image content, and display the plurality of subtitle pages to a user through the display,
wherein the audio information providing unit analyzes an audio feature of the image content and sets a speech interval during which the voice of a character is output in the image content, and
the subtitle page generating unit resets the subtitle interval corresponding to the speech interval,
wherein the audio information providing unit classify short audio intervals into a speech interval and a non-speech interval, relative to the similarity between the audio feature of the actual speech,
wherein the subtitle page generating unit resets the start time of the subtitle interval with reference to the speech start time of the speech interval, and resets the end time of the subtitle interval with reference to the speech end time of the speech interval.

16. The content providing terminal of claim 15, further comprising a communication unit connected to a server through the Internet,
wherein the unit subtitle and the representative image are source information provided to the server in response to a source information request from the subtitle page generating unit, and
the subtitle page generating unit receives the source information through the communication unit, and generates a plurality of subtitle pages by using the source information.

* * * * *